United States Patent
Shiina

(10) Patent No.: US 11,474,405 B2
(45) Date of Patent: Oct. 18, 2022

(54) DISPLAY DEVICE

(71) Applicant: Japan Display Inc., Minato-ku (JP)

(72) Inventor: Hideki Shiina, Tokyo (JP)

(73) Assignee: Japan Display Inc., Tokyo (JP)

( * ) Notice: Subject to any disclaimer, the term of this patent is extended or adjusted under 35 U.S.C. 154(b) by 163 days.

(21) Appl. No.: 16/986,389

(22) Filed: Aug. 6, 2020

(65) Prior Publication Data

US 2020/0363670 A1 Nov. 19, 2020

Related U.S. Application Data

(63) Continuation of application No. PCT/JP2018/047600, filed on Dec. 25, 2018.

(30) Foreign Application Priority Data

Mar. 2, 2018 (JP) ................ JP2018-037619

(51) Int. Cl.
*G02F 1/1368* (2006.01)
*G02F 1/1362* (2006.01)

(52) U.S. Cl.
CPC ...... *G02F 1/1368* (2013.01); *G02F 1/136227* (2013.01); *G02F 2201/121* (2013.01); *G02F 2201/123* (2013.01)

(58) Field of Classification Search
CPC ............. G02F 1/1368; G02F 1/136227; G02F 2201/121; G02F 2201/123; G02F 1/13338
See application file for complete search history.

(56) References Cited

U.S. PATENT DOCUMENTS

| | | | |
|---|---|---|---|
| 2008/0180622 A1 | 7/2008 | Horiguchi et al. | |
| 2013/0162570 A1* | 6/2013 | Shin ................. | G02F 1/134309 |
| | | | 345/173 |
| 2017/0123285 A1 | 5/2017 | Suzuki et al. | |
| 2017/0176820 A1 | 6/2017 | Nomura | |

FOREIGN PATENT DOCUMENTS

| | | |
|---|---|---|
| JP | 2008-180928 A | 8/2008 |
| JP | 2017-83760 A | 5/2017 |
| JP | 2017-111396 A | 6/2017 |

OTHER PUBLICATIONS

Office Action dated Nov. 30, 2021 in corresponding Japanese Patent Application No. 2018-037619 (English Translation only), 5 pages.
International Search Report dated Mar. 5, 2019 in PCT/JP2018/047600 filed Dec. 25, 2018, 2 pages.

* cited by examiner

*Primary Examiner* — James A Dudek
(74) *Attorney, Agent, or Firm* — Maier & Maier, PLLC

(57) ABSTRACT

According to one embodiment, a display device includes a switching element, a common electrode, an insulating film covering the common electrode, a first pixel electrode electrically connected to the switching element in a first contact hole penetrating the insulating film, and a transparent conductive film electrically connected to the common electrode in a second contact hole penetrating the insulating film. The first pixel electrode and the transparent conductive film are arranged in a first direction in a same layer. A size of the first contact hole and a size of the second contact hole are different from each other in planar view.

8 Claims, 13 Drawing Sheets

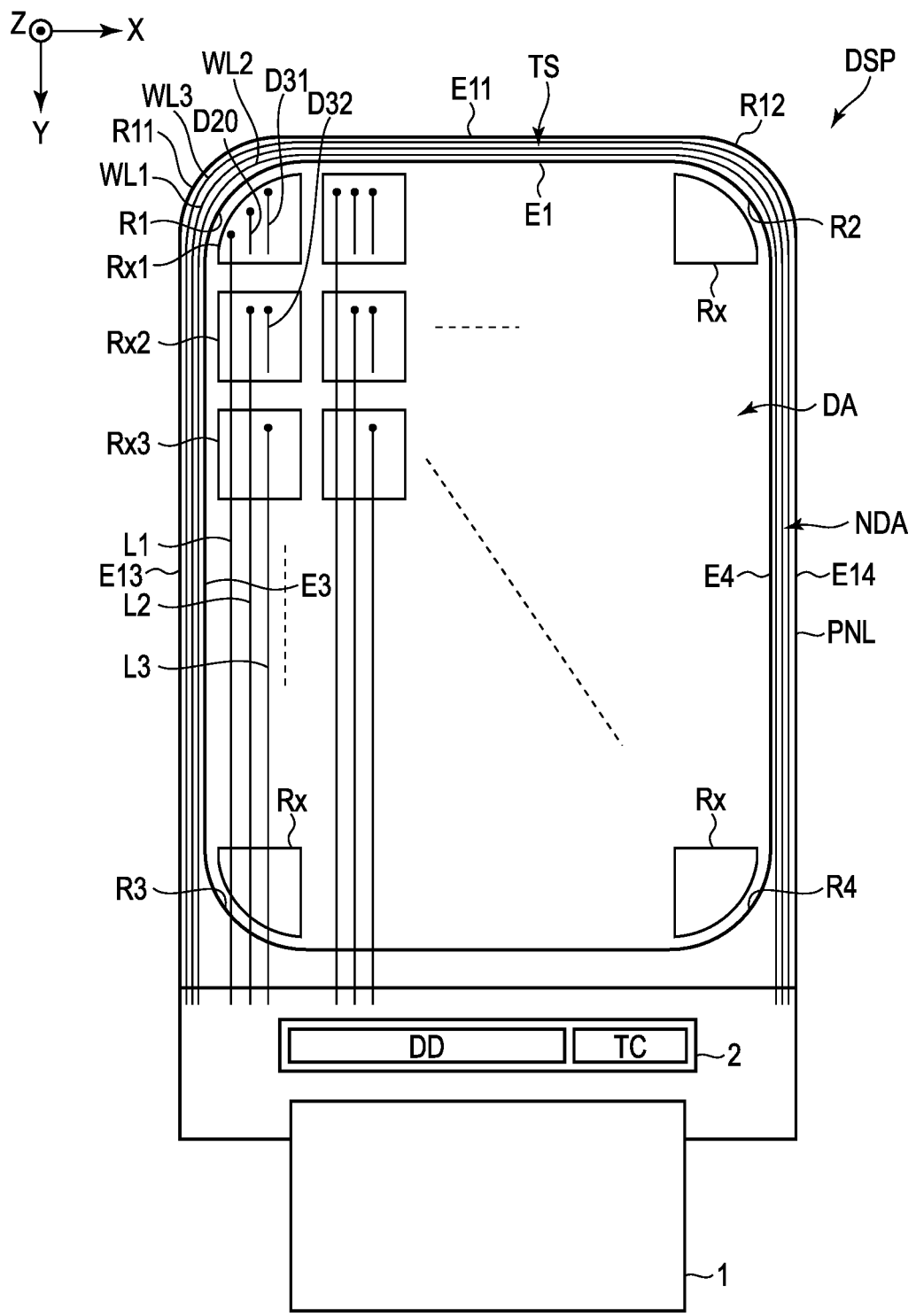
F I G. 2

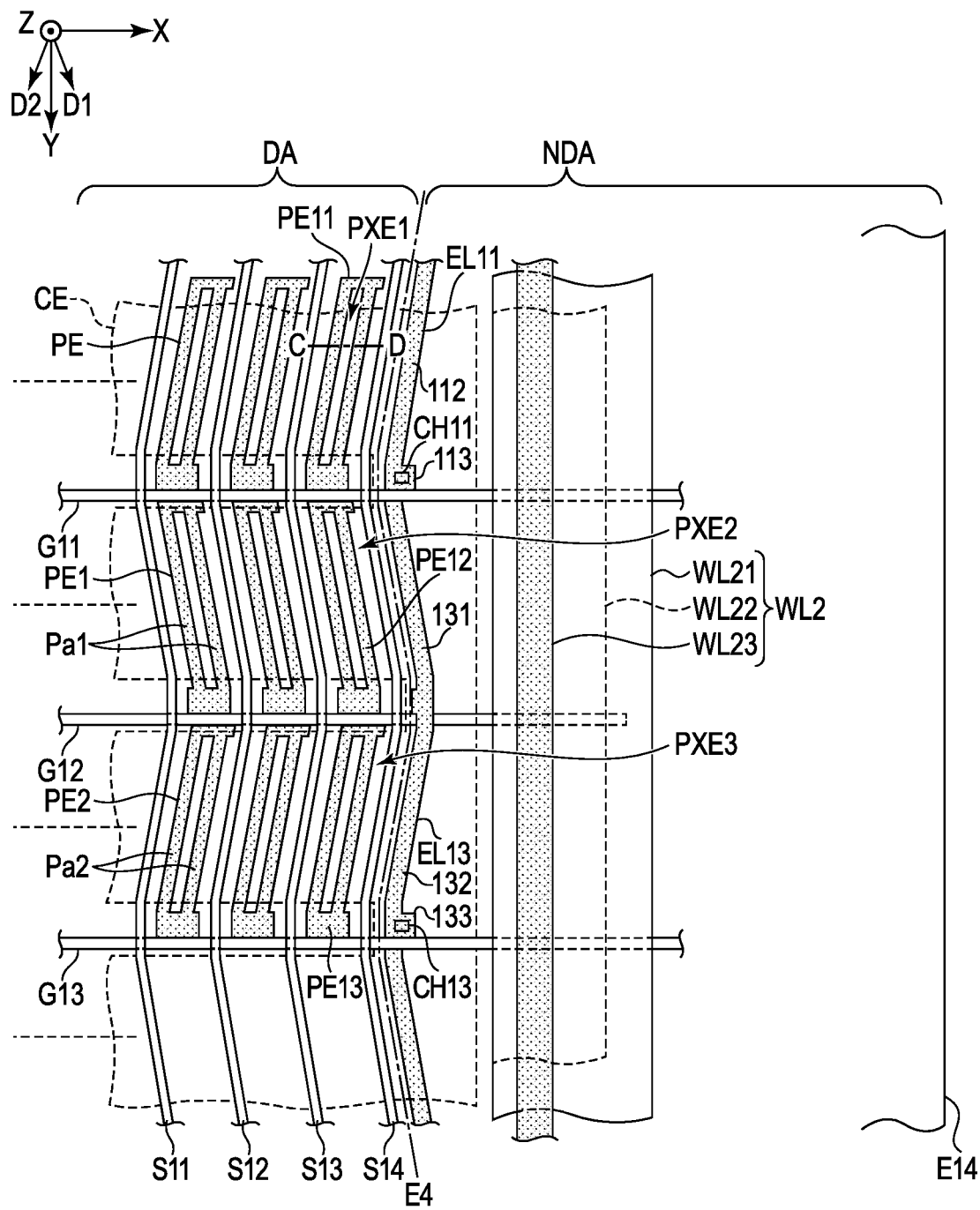
F I G. 5B

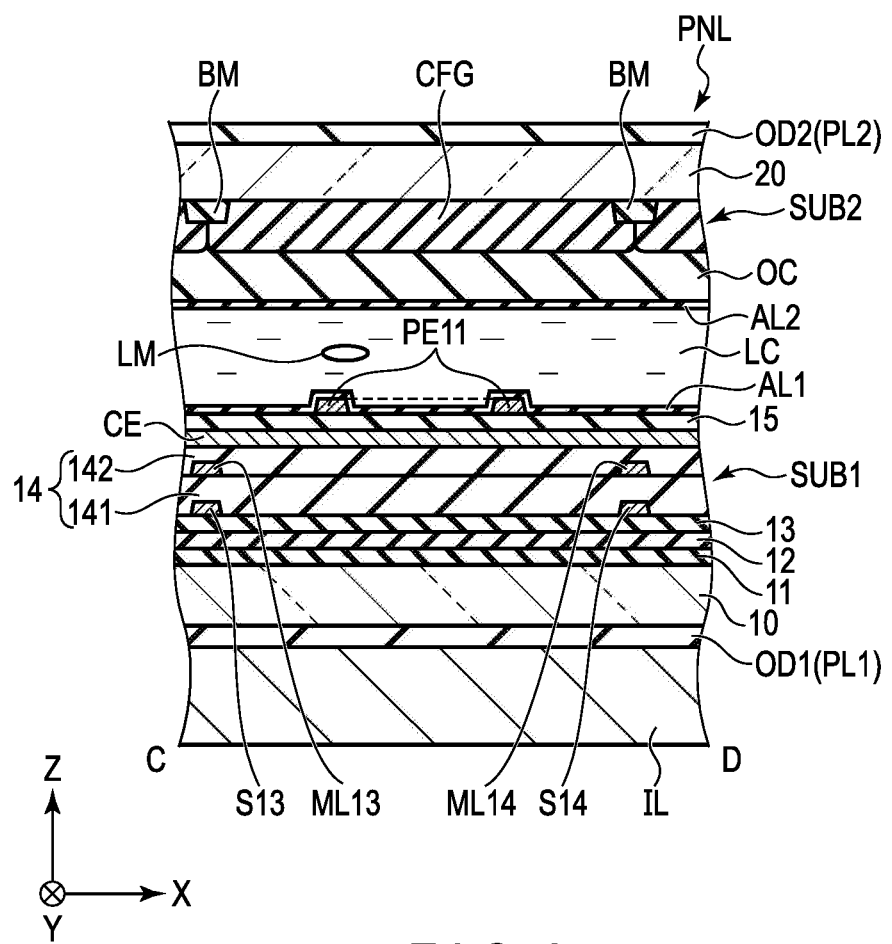
F I G. 9

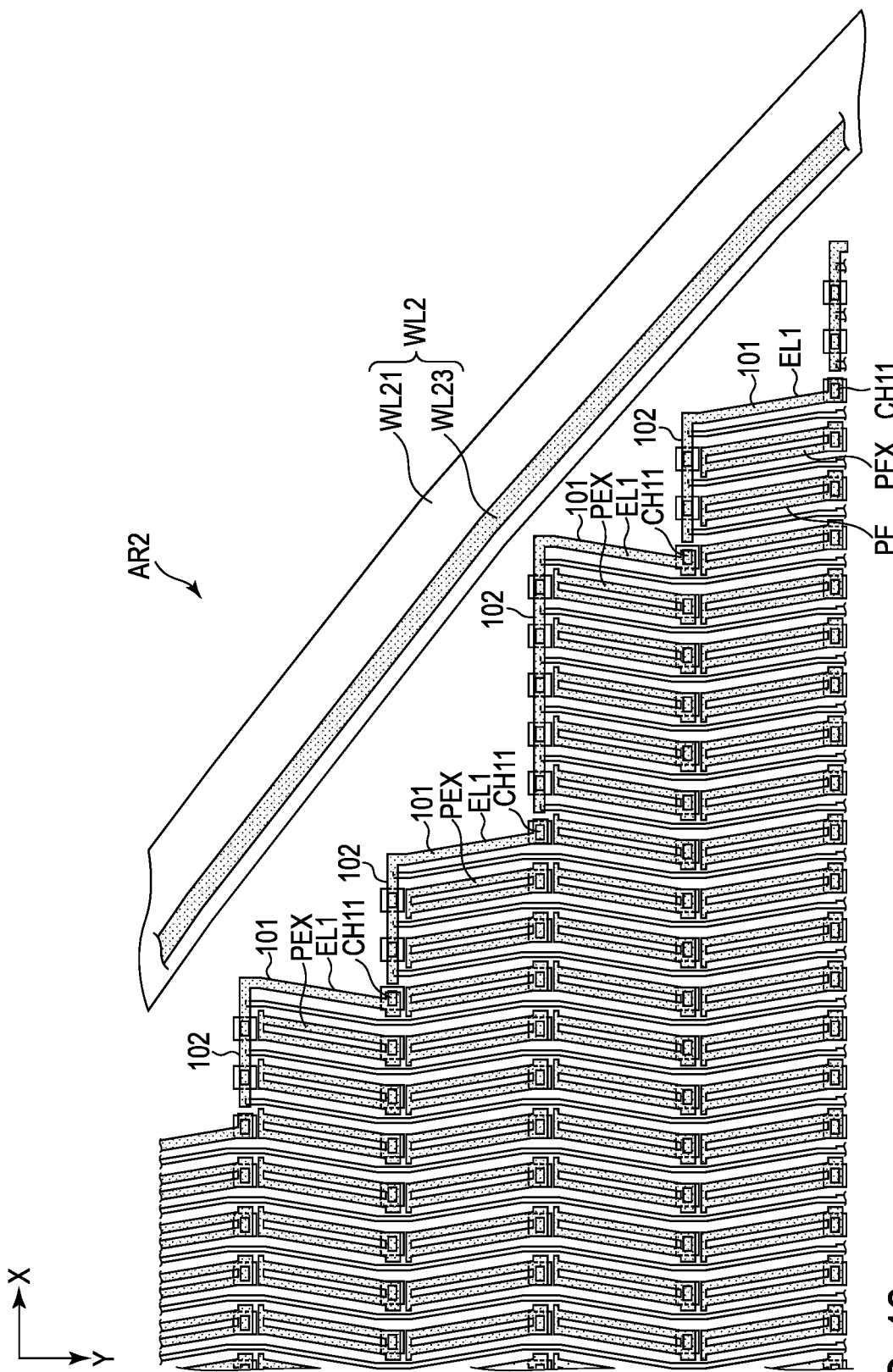
F I G. 12

DISPLAY DEVICE

CROSS-REFERENCE TO RELATED APPLICATIONS

This application is a Continuation Application of PCT Application No. PCT/JP2018/047600, filed Dec. 25, 2018 and based upon and claiming the benefit of priority from Japanese Patent Application No. 2018-037619, filed Mar. 2, 2018, the entire contents of all of which are incorporated herein by reference.

FIELD

Embodiments described herein relate generally to a display device.

BACKGROUND

Recently, various technologies for improving the display quality of a display device have been considered. For example, a technology for achieving uniform dimensional accuracy in pixel electrodes formed by patterning a conductive film by disposing dummy pixel electrodes in the same layer as the pixel electrodes on the outer side of a display portion has been disposed.

BRIEF DESCRIPTION OF THE DRAWINGS

FIG. 2 is a plan view showing a configuration example of a touch sensor TS.

FIG. 5B is another enlarged plan view of the area AR1 close to the straight portion E14 shown in FIG. 1.

FIG. 9 is a cross-sectional view of a display panel PNL taken along line C-D shown in FIG. 5B.

FIG. 12 is a plan view showing another configuration of the area AR2 close to the round portion R12 shown in FIG. 1.

DETAILED DESCRIPTION

Figure 1:
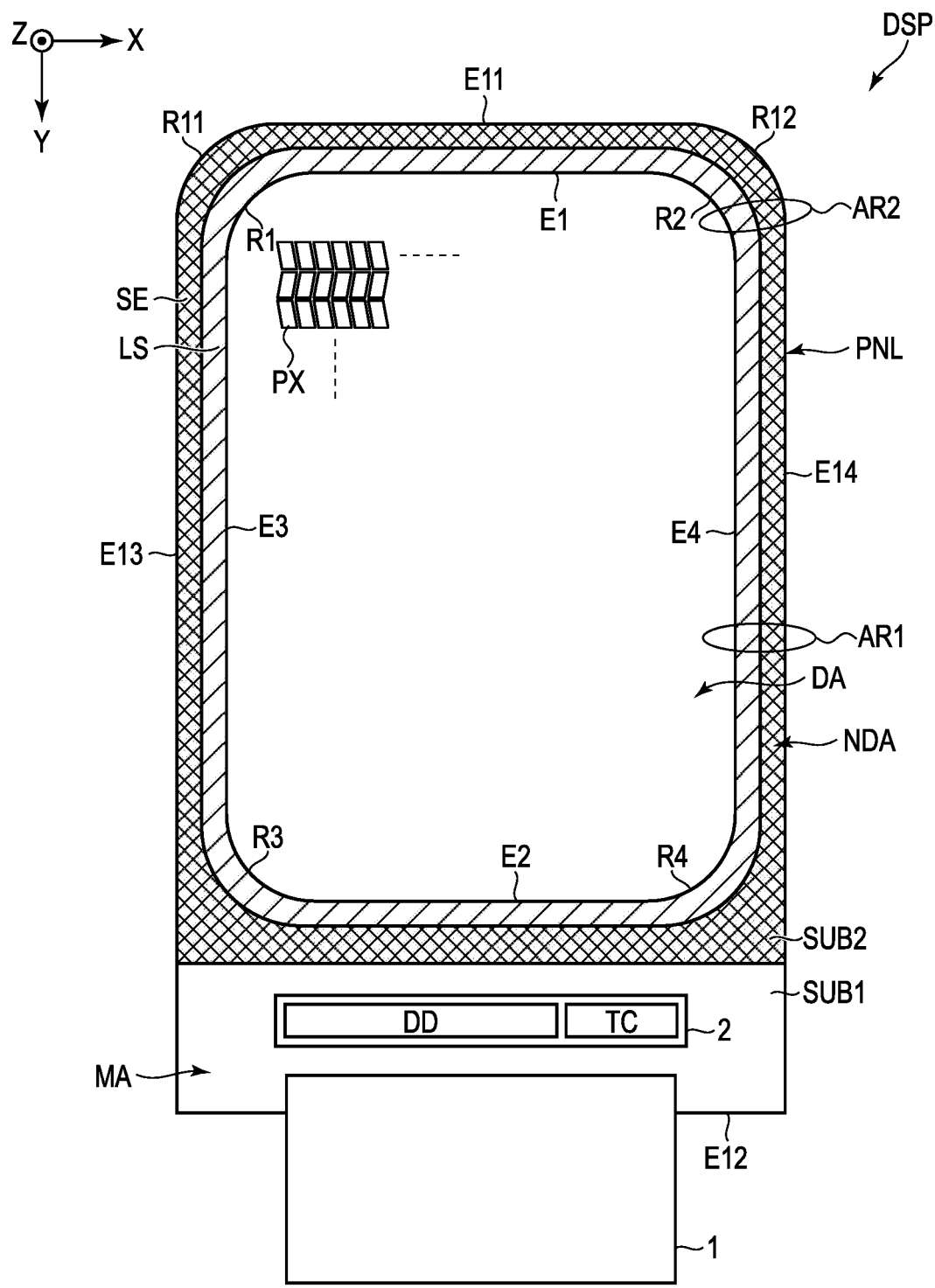
FIG. 1 is a plan view showing the external appearance of a display device DSP of the present embodiment.

In general, according to one embodiment, there is provided a display device including a switching element, a common electrode, an insulating film covering the common electrode, a first pixel electrode electrically connected to the switching element in a first contact hole penetrating the insulating film, and a transparent conductive film electrically connected to the common electrode in a second contact hole penetrating the insulating film. The first pixel electrode and the transparent conductive film are arranged in a first direction in a same layer. The first pixel electrode is opposed to the common electrode in a display portion displaying an image. The transparent conductive film is opposed to the common electrode in a non-display portion surrounding the display portion. The common electrode is disposed over the display portion and the non-display portion. A size of the first contact hole and a size of the second contact hole are different from each other in planar view.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, and the like of the respective parts are illustrated schematically in the drawings, rather than as an accurate representation of what is implemented, but such schematic illustration is merely exemplary, and in no way restricts the interpretation of the invention. In addition, in the specification and drawings, constituent elements which function in the same or a similar manner to those described in connection with preceding drawings are denoted by the same reference numbers, and detailed explanations of them that are considered redundant may be appropriately omitted.

In the present embodiment, a liquid crystal display device is explained as an example of a display device DSP. The main configuration disclosed in the present embodiment can be applied to a self-luminous display device including an organic electroluminescent display element or the like, an electronic paper display device including an electrophoretic element or the like, a display device employing microelectromechanical systems (MEMS), a display device employing electrochromism, and the like.

FIG. 1 is a plan view showing the external appearance of the display device DSP of the present embodiment. A first direction X, a second direction Y and a third direction Z are, for example, orthogonal to one another but may cross at an angle other than 90 degrees. The first direction X and the second direction Y correspond to directions parallel to the main surface of a substrate constituting the display device DSP, and the third direction Z corresponds to the thickness direction of the display device DSP. In the present specification, a position on the pointing end side of an arrow indicating the third direction Z is referred to as above, and a position on a side opposite to the pointing end of the arrow is referred to as below. In addition, an observation position at which the display device DSP is observed is assumed to be located on the pointing end side of the arrow indicating the third direction Z, and viewing from this observation position toward an X-Y plane defined by the first direction X and the second direction Y is referred to as planar view.

A plan view of the display device DSP in the X-Y plane is shown here. The display device DSP includes a display panel PNL, a flexible printed circuit board 1 and an IC chip 2.

The display panel PNL is a liquid crystal display panel, and includes a first substrate SUB1, a second substrate SUB2, a liquid crystal layer LC which will be described later, a sealant SE and a light-shielding layer LS. The display panel PNL includes a display portion DA which displays an image, and a frame-shaped non-display portion NDA which surrounds the display portion DA. The second substrate SUB2 is opposed to the first substrate SUB1 in the third direction Z. The first substrate SUB1 has a mounting portion MA extending in the second direction Y more than the second substrate SUB2.

The sealant SE is located in the non-display portion NDA, bonds the first substrate SUB1 and the second substrate SUB2 together, and seals in the liquid crystal layer LC. The light-shielding layer LS is located in the non-display portion NDA. The sealant SE is disposed at a position overlapping the light-shielding layer LS in planar view. In FIG. 1, an area where the sealant SE is disposed and an area where the light-shielding layer LS is disposed are shown by different hatch lines, and an area where the sealant SE and the light-shielding layer LS overlap is shown by crosshatching. The light-shielding layer LS is disposed in the second substrate SUB2.

The display portion DA is located on an inner side surrounded by the light-shielding layer LS. The display portion DA includes a plurality of pixels PX arranged in a matrix in the first direction X and the second direction Y. The display portion DA has a pair of edge portions E1 and E2 extending along the first direction X, a pair of edge portions E3 and E4 extending along the second direction Y, and four round portions R1 to R4. The display panel PNL has a pair of straight portions E11 and E12 extending along the first direction X, a pair of straight portions E13 and E14 extending along the second direction Y, and two round portions R11 and R12. The round portions R11 and R12 are located on the outer sides of the round portions R1 and R2, respectively. The radius of curvature of the round portion R11 may be the same as or different from the radius of curvature of the round portion R1.

The flexible printed circuit board 1 and the IC chip 2 are mounted on the mounting portion MA. Note that the IC chip 2 may be mounted on the flexible printed circuit board 1. The IC chip 2 includes a built-in display driver DD which outputs a signal required for displaying an image in a display mode of displaying an image. In the illustrated example, the IC chip 2 includes a built-in touch controller TC which controls a touch sensing mode of detecting approach or contact of an object to or with the display device DSP.

The display panel PNL of the present embodiment may be a transmissive type having a transmissive display function of displaying an image by selectively transmitting light from the rear surface side of the first substrate SUB1, a reflective type having a reflective display function of displaying an image by selectively reflecting light from the front surface side of the second substrate SUB2, or a transflective type having the transmissive display function and the reflective display function.

In addition, although the explanation of the detailed configuration of the display panel PNL is omitted here, the display panel PNL may have a configuration conforming to any one of a display mode using a lateral electric field along a substrate main surface, a display mode using a longitudinal electric field along a normal to a substrate main surface, a display mode using an inclined electric field inclined in an direction inclined with respect to a substrate main surface, and an appropriate combination of the lateral electric field, the longitudinal electric field and the inclined electric field. The substrate main surface here is a surface parallel to the X-Y plane defined by the first direction X and the second direction Y.

FIG. 2 is a plan view showing a configuration example of a touch sensor TS. Although the touch sensor TS of a self-capacitance method is explained here, the touch sensor TS may be of a mutual-capacitance method. The touch sensor TS includes a plurality of sensor electrodes Rx (Rx1, Rx2, etc.) and a plurality of sensor lines L (L1, L2, etc.). The sensor electrodes Rx are located in the display portion DA and are arranged in a matrix in the first direction X and the second direction Y. One sensor electrode Rx constitutes a sensor block which is the smallest unit which can perform touch sensing. The sensor lines L extend along the second direction Y and are arranged in the first direction X in the display portion DA. Each sensor line L is disposed at, for example, a position overlapping a signal line S which will be described later. In addition, each sensor line L is drawn to the non-display portion NDA and is electrically connected to the IC chip 2.

Here, attention will be focused on the relationship between the sensor lines L1 to L3 arranged in the first direction X and the sensor electrodes Rx1 to Rx3 arranged in the second direction Y. The sensor line L1 overlaps the sensor electrodes Rx1 to Rx3 and is electrically connected to the sensor electrode Rx1. The sensor line L2 overlaps the sensor electrodes Rx2 and Rx3 and is electrically connected to the sensor electrode Rx2. A dummy line D20 is apart from the sensor line L2. The dummy line D20 overlaps the sensor electrode Rx1 and is electrically connected to the sensor electrode Rx1. The sensor line L2 and the dummy line D20 are located on the same signal line. The sensor line L3 overlaps the sensor electrode Rx3 and is electrically connected to the sensor electrode Rx3. A dummy line D31 overlaps the sensor electrode Rx1 and is electrically connected to the sensor electrode Rx1. A dummy line D32 is apart from the dummy line D31 and the sensor line L3. The dummy line D32 overlaps the sensor electrode Rx2 and is electrically connected to the sensor electrode Rx2. The sensor line L3 and the dummy lines D31 and D32 are located on the same signal line.

In the touch sensing mode, the touch controller TC applies a touch drive voltage to the sensor lines L. Accordingly, the touch drive voltage is applied to the sensor electrodes Rx, and sensing is performed in the sensor electrodes Rx. Sensor signals corresponding to the sensing results in the sensor electrodes Rx are output to the touch controller TC via the sensor lines L. The touch controller TC or an external host detects the presence or absence of the approach or contact of an object to or with the display device DSP and the coordinates of the position of an object based on the sensor signals.

Note that, in the display mode, the sensor electrodes Rx function as common electrodes CE to which a common voltage (Vcom) is applied. The common voltage is a voltage different from the touch drive voltage, and is applied from, for example, a voltage supply unit included in the display driver DD via the sensor lines L.

In the non-display portion NDA, the wiring lines WL1 to WL3 are disposed. In the illustrated example, the wiring lines WL1 to WL3 are disposed along the straight portion E13, the round portion R11, the straight line E11, the round portion R12 and the straight line E14. The wiring line WL2 is the closest of the wiring lines WL1 to WL3 to the display portion DA. The wiring line WL1 is located between the wiring line WL2 and the wiring line WL3. For example, the potential of the wiring line WL1 is a fixed potential different from the potentials of the wiring lines WL2 and WL3. In addition, the potential of the wiring line WL2 is the same as the potential of the wiring line WL3. For example, the common voltage is applied to the wiring line WL2 and the wiring line WL3. The potential of the wiring line WL1 may be relatively lower or higher than the potential of the wiring line WL2. In a case where the potential of the wiring line WL1 is lower than the potential of the wiring line WL2, the wiring line WL1 functions as an ion trap line which traps impurity ions having positive polarity. Alternatively, in a case where the potential of the wiring line WL1 is higher than the potential of the wiring line WL2, the wiring line WL1 functions as an ion trap line which traps impurity ions having negative polarity.

Figure 3:
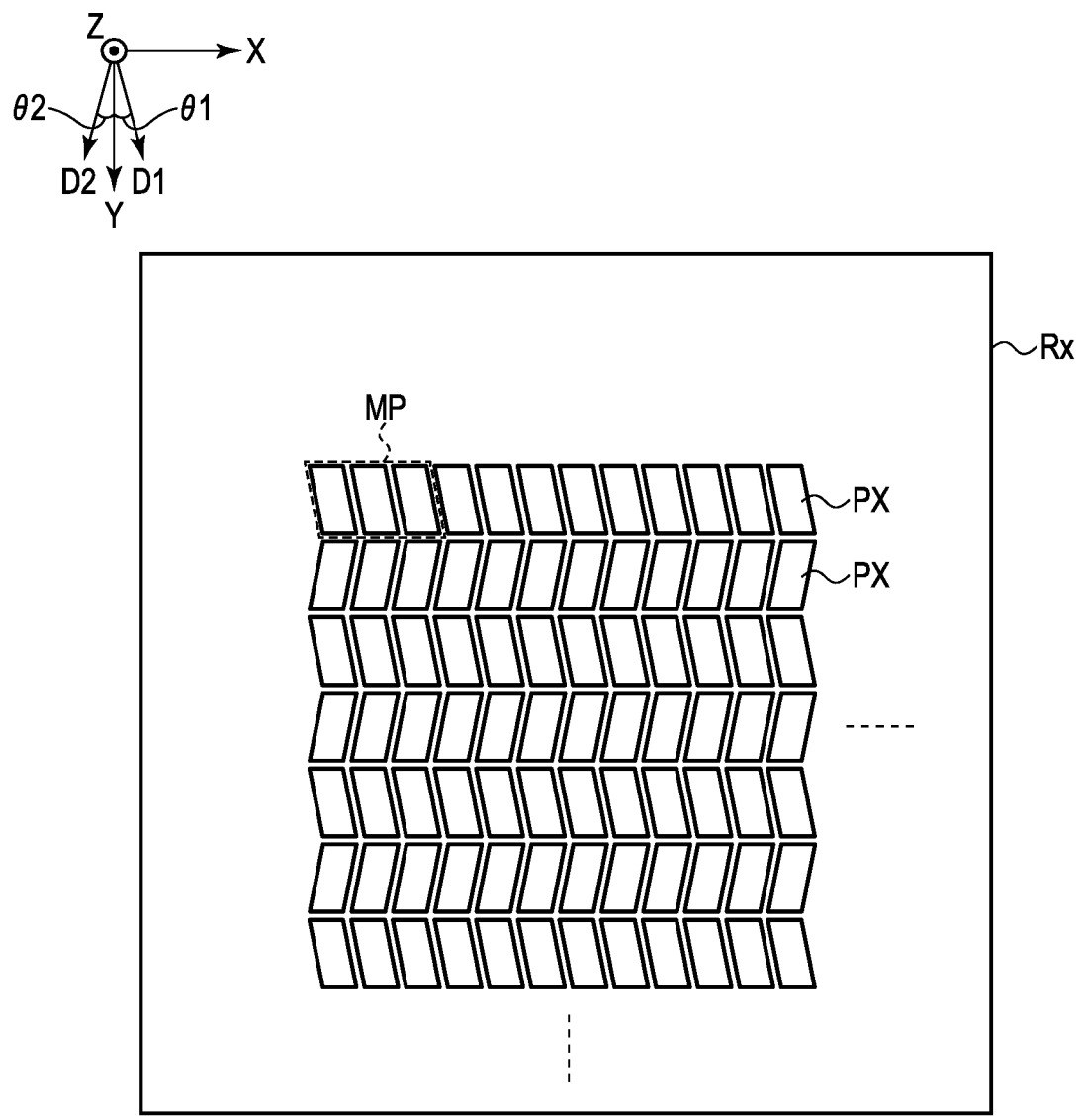
FIG. 3 is a plan view showing a sensor electrode Rx shown in FIG. 2 and pixels PX.

FIG. 3 is a plan view showing the sensor electrode Rx shown in FIG. 2 and pixels PX. In FIG. 3, a direction crossing at an acute angle counterclockwise with respect to the second direction Y is define as a direction D1, and a direction crossing at an acute angle clockwise with respect to the second direction Y is defined as a direction D2. Note that an angle θ1 formed by the second direction Y and the direction D1 is substantially the same as an angle θ2 formed by the second direction Y and the direction D2.

One sensor electrode Rx is arranged over a plurality of pixels PX. In the illustrated example, the pixels PX located in odd-numbered rows along the second direction Y extend along the direction D1. In addition, the pixels PX located in even-numbered rows along the second direction Y extend along the direction D2. Note that the pixel PX here indicates the smallest unit which can be individually controlled according to a pixel signal and is referred to also as a sub-pixel. In addition, the smallest unit which realizes color display may be referred to as a main pixel MP. The main pixel MP is composed of a plurality of sub-pixels PX which display different colors. For example, the main pixel MP includes a red pixel which displays red, a green pixel which displays green and a blue pixel which displays blue as sub-pixels PX. In addition, the main pixel MP may include a white pixel which displays white.

For example, in one sensor electrode Rx, 60 to 70 main pixels MP are arranged along the first direction X, and 60 to 70 main pixels MP are arranged along the second direction Y.

Figure 4:
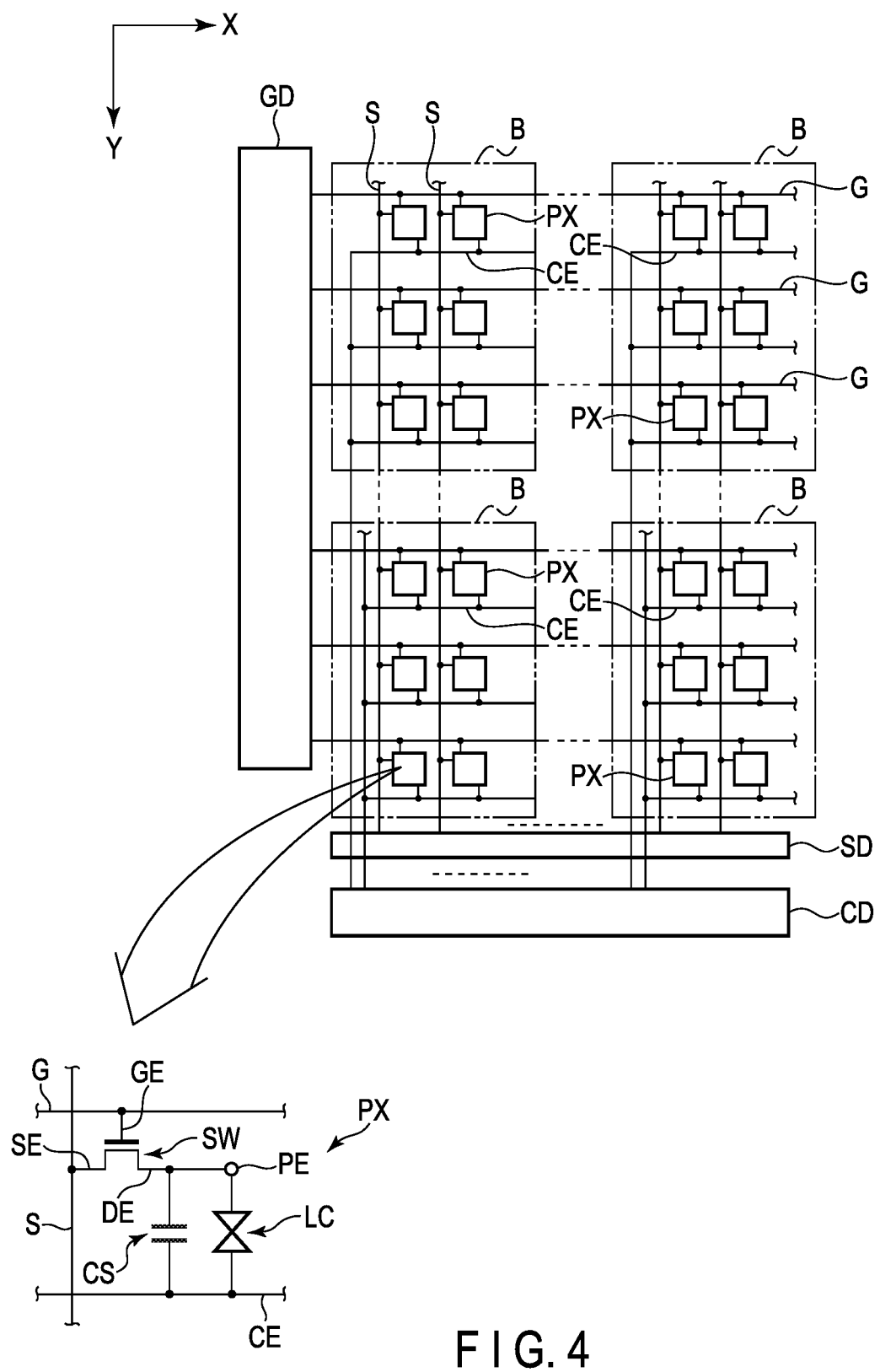
FIG. 4 is an illustration showing the basic configuration and equivalent circuit of the pixel PX.

FIG. 4 is an illustration showing the basic configuration and equivalent circuit of the pixel PX. A plurality of scanning lines G are connected to a scanning line drive circuit GD. A plurality of signal lines S are connected to a signal line drive circuit SD. Note that the scanning lines G and the signal lines S do not necessarily linearly extend but may be partly bent. For example, even if the signal lines S are partly bent, the signal lines S are assumed to extend in the second direction Y.

A common electrode CE is disposed in each sensor block B. Each common electrode CE is connected to a voltage supply unit CD of the common voltage (Vcom) and is arranged over a plurality of pixels PX. In addition, each common electrode CE is connected to the touch controller TC and functions as the sensor electrode Rx as described above.

Each pixel PX includes a switching element SW, a pixel electrode PE, the common electrode CE, a liquid crystal layer LC and the like. The switching element SW is composed of, for example, a thin-film transistor (TFT) and is electrically connected to the scanning line G and the signal line S. The scanning line G is electrically connected to a gate electrode GE of the switching element SW in each of the pixels PX arranged in the first direction X. The signal line S is electrically connected to a source electrode SE of the switching element SW in each of the pixels PX arranged in the second direction Y. The pixel electrode PE is electrically connected to a drain electrode DE of the switching element SW. Each pixel electrode PE is opposed to the common electrode CE and drives the liquid crystal layer LC by an electric field generated between the pixel electrode PE and the common electrode CE. A storage capacitance CS is formed between, for example, an electrode having the same potential as the common electrode CE and an electrode having the same potential as the pixel electrode PE.

Figure 5A:
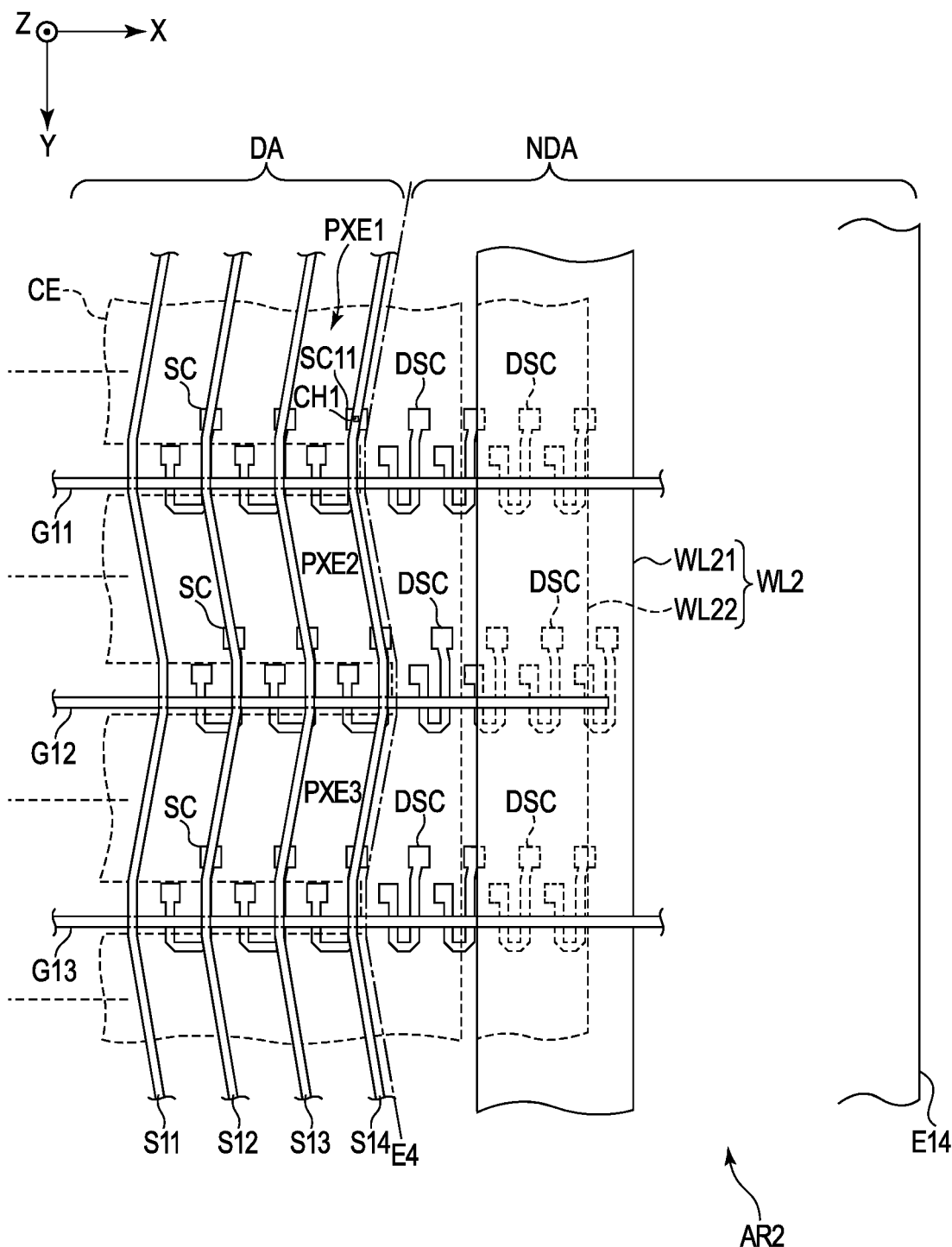
FIG. 5A is an enlarged plan view of an area AR1 close to a straight portion E14 shown in FIG. 1.

FIGS. 5A and 5B are enlarged views of an area AR1 close to the straight portion E14 shown in FIG. 1. The respective layers of a semiconductor layer SC, the scanning line G and the signal line S included in the first substrate SUB1 are illustrated in FIG. 5A, and the respective layers of the scanning line G, the signal line S and the pixel electrode PE are illustrated in FIG. 5B. Note that the layer of the common electrode CE is shown by a dotted line. The illustration of the configuration between the wiring line WL2 and the straight portion E13 is omitted.

As shown in FIG. 5A, the scanning lines G11 to G13 linearly extend along the first direction X and are arranged at intervals in the second direction Y. The signal lines S11 to S14 extend along substantially the second direction Y and are arranged at intervals in the first direction X. The scanning lines G11 to G13 and the signal lines S11 to S14 cross each other. The common electrode CE is disposed over the display portion DA and the non-display portion NDA.

In the display portion DA, each of the scanning lines G11 to G13 and a plurality of semiconductor layers SC cross each other. In addition, each of the signal lines S11 to S14 is electrically connected to a plurality of semiconductor layers SC. Pixels PXE1 to PXE3 located between the signal lines S13 and S14 correspond to the outermost pixels in the display portion DA. That is, the pixels PXE1 to PXE3 are the closest pixels to the non-display portion NDA or the closest pixels to the straight portion E14. For example, a semiconductor layer SC11 in the pixel PXE1 crosses the scanning line G11 at two positions, and is electrically connected to the signal line S14 in a contact hole CH1.

In the non-display portion NDA, each of the scanning lines G11 to G13 and a plurality of dummy semiconductor layers DSC cross each other. Each dummy semiconductor layer DSC is not electrically connected to any of the signal lines S11 to S14 and is electrically floating. The dummy semiconductor layers DSC adjacent to the display portion DA overlap the common electrode CE. The dummy semiconductor layers DSC apart from the display portion DA overlap the wiring line WL2 having a fixed potential.

The wiring line WL2 is apart from the common electrode CE. The wiring line WL2 includes a first layer WL21 and a second layer WL22. The first layer WL21 is a metal layer located in the same layer as the signal line S and formed of the same material as the signal line S. The second layer WL22 is a transparent conductive layer located in the same layer as the common electrode CE and formed of the same material as the common electrode CE, and is overlaid on the first layer WL21. Note that an insulating film is interposed between the first layer WL21 and the second layer WL22.

As shown in FIG. 5B, the pixel electrodes PE are arranged in a matrix in the first direction X and the second direction Y in the display portion DA. In addition, each pixel electrode PE is opposed to the common electrode CE in the display portion DA. For example, a pixel electrode PE1 located between the scanning lines G11 and G12 includes a plurality of strip electrodes Pa1 extending along the direction D1. In addition, a pixel electrode PE2 located between the scanning lines G12 and G13 includes a plurality of strip electrodes Pa2 extending along the direction D2. The number of strip electrodes Pa1 and the number of strip electrodes Pa2 are two in the illustrated example but may be greater than or equal to three. In addition, the number of strip electrodes Pa1 may be different from the number of strip electrodes Pa2.

A pixel electrode PE11 of the pixel PXE1 is electrically connected to the semiconductor layer SC11 shown in FIG. 5A. A pixel electrode PE12 of the pixel PXE2 has the same shape as the pixel electrode PE1. The pixel electrode PE11 and a pixel electrode PE13 of the pixel PXE3 have the same shape as the pixel electrode PE2.

Wire electrodes EL11 and EL13 are located in the non-display portion NDA. Both of the wire electrodes EL11 and EL13 are transparent conductive films (or transparent electrodes) located in the same layer as the pixel electrode PE and formed of the same material as the pixel electrode PE. The wire electrodes EL11 and EL13 are opposed to the common electrode CE in the non-display portion NDA. The pixel electrode PE11 and the wire electrode EL11 are arranged in the first direction X. In addition, the pixel electrode PE12 and the wire electrode EL13 are arranged in the first direction X, and the pixel electrode PE13 and the wire electrode EL13 are arranged in the first direction X. The signal line S14 is located between the pixel electrode PE11 and the wire electrode EL11 and between the pixel electrode PE12 and the wire electrode EL13.

The wire electrode EL13 will be more specifically explained. The wire electrode EL13 crosses the scanning line G12 and is adjacent to two pixels PXE2 and PXE3 arranged in the second direction Y. The wire electrode EL13 includes an electrode portion 131 extending along the direction D1, an electrode portion 132 extending along the direction D2, and a base portion 133. The pixel electrode PE12 and the electrode portion 131 are arranged in the first direction X, and the pixel electrode PE13 and the electrode portion 132 are arranged in the first direction X. The base portion 133 is located close to a portion in which the scanning line G13 and the signal line S14 cross each other, and is electrically connected to the common electrode CE in a contact hole CHl3.

The wiring line WL2 further includes a third layer WL23. The third layer WL23 is a transparent conductive layer located in the same layer as the pixel electrode PE11, the wire electrode EL11 and the like and formed of the same material as the pixel electrode PE.

In the example shown in FIG. 5B, the pixel electrode PE11 corresponds to the first pixel electrode. Alternatively, the pixel electrode PE12 corresponds to the first pixel electrode, and the pixel electrode PE13 corresponds to the second pixel electrode.

Figure 6:
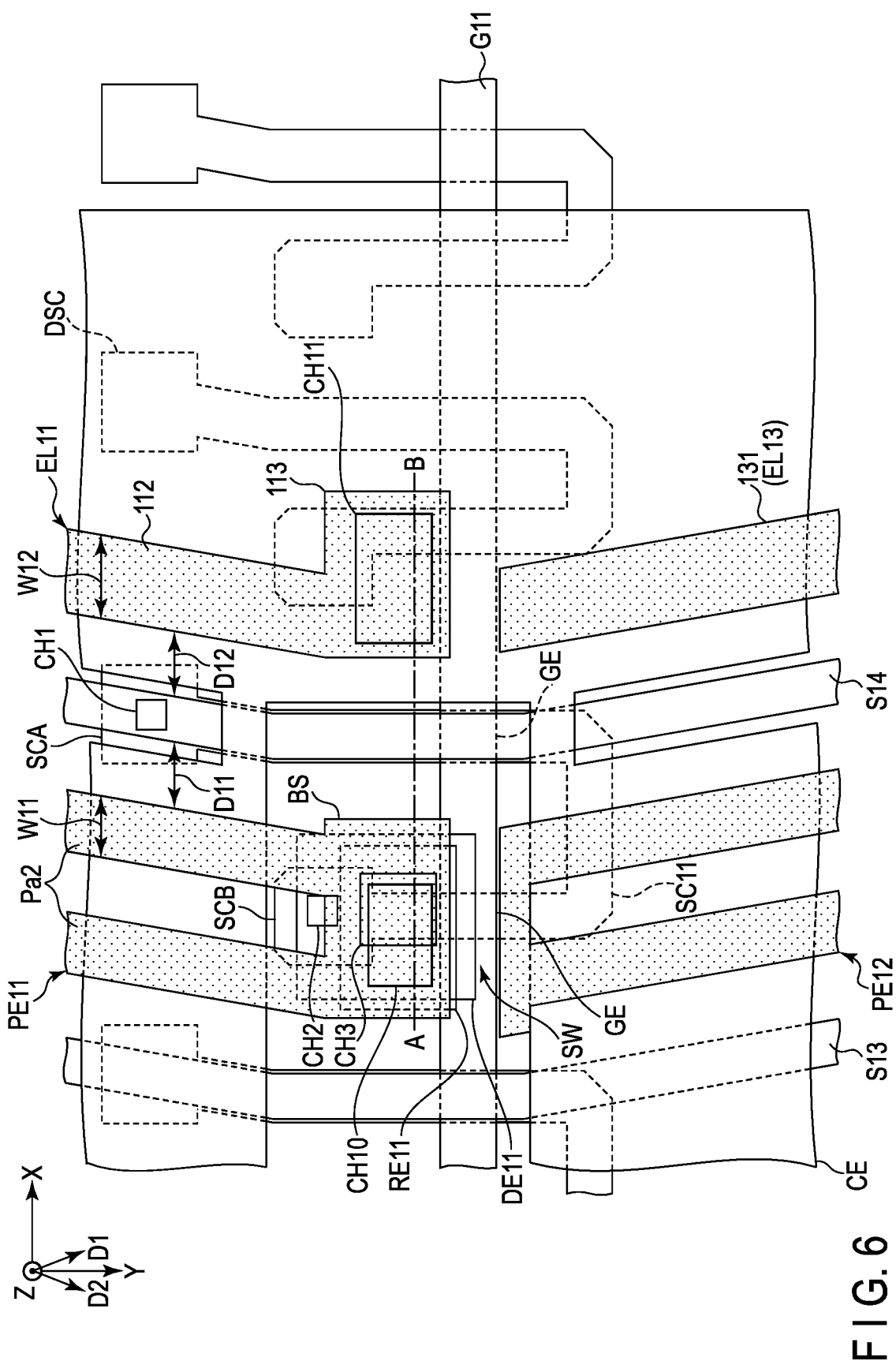
FIG. 6 is an enlarged plan view showing a pixel electrode PE11 and a wire electrode EL11 shown in FIG. 5B.

FIG. 6 is an enlarged plan view showing the pixel electrode PE11 and the wire electrode EL11 shown in FIG. 5B.

The switching element SW is electrically connected to the scanning line G11 and the signal line S14. The switching element SW in the illustrated example has a double-gate structure. The switching element SW includes the semiconductor layer SC11 and a drain electrode DE11. Note that the drain electrode DE11 may be referred to as a source electrode in the switching element SW. The semiconductor layer SC11 overlaps the signal line S14 in one portion, extends between the signal lines S13 and S14 in the other portion, and is formed in a substantially U shape. The semiconductor layer SC11 crosses the scanning line G11 in an area overlapping the signal line S14 and in an area between the signal lines S13 and S14. In the scanning line G11, the areas overlapping the semiconductor layer SC11 function as gate electrodes GE. The signal line S14 is electrically connected to one end portion SCA of the semiconductor layer SC11 in the contact hole CH1. The drain electrode DE11 is formed in the shape of an island and is disposed between the signal lines S13 and S14. The drain electrode DE11 is electrically connected to the other end portion SCB of the semiconductor layer SC11 in the contact hole CH2.

The pixel electrode PE11 includes a base portion BS which is integrally formed with the strip electrodes Pa2. The base portion BS overlaps the drain electrode DE11. The base portion BS is electrically connected to the drain electrode DE11. In the illustrated example, a structure of connection between the drain electrode DE11 and the pixel electrode PE11 will be briefly explained. A connection electrode RE11 is disposed between the drain electrode DE11 and the base portion BS. The connection electrode RE11 is a transparent electrode formed of the same material as the common electrode CE and is formed in the same process as the common electrode CE. The connection electrode RE11 is electrically connected to the drain electrode DE11 in the contact hole CH3. The base portion BS is electrically connected to the connection electrode RE11 in a contact hole CH10.

The wire electrode EL11 includes an electrode portion 112 and a base portion 113. The base portion 113 is electrically connected to the common electrode CE in a contact hole CH11. The base portion 113 overlaps the entire contact hole CH11 in planar view. The contact hole CH11 here is a hole penetrating an insulating film interposed between the common electrode CE and the base portion 113, and indicates the boundary between the insulating film and the common electrode CE in planar view. That is, the base portion 113 covers the entire common electrode CE exposed from the contact hole CH11.

Attention will be focused on the pixel electrode PE11 and the wire electrode EL11. When a width W11 of the strip electrode Pa2 and a width W12 of the electrode portion 112 are compared with each other, the width W12 is greater than the width W11. Note that the widths W11 and W12 here are lengths along the first direction X.

The electrode portion 112 extends in a direction parallel to the strip electrode Pa2. In the illustrated example, both the strip electrode Pa2 and the electrode portion 112 extend along the direction D2.

A distance D11 between the strip electrode Pa2 and the signal line S14 is equal to a distance D12 between the electrode portion 112 and the signal line S14. The distances D11 and D12 are lengths along the first direction X.

The size of the contact hole CH10 is different from the size of the contact hole CH11. In the illustrated example, the size of the contact hole CH11 is greater than the size of the contact hole CH10 in planar view. Note that the size of the contact hole CH10 can be defined as, for example, the area of the connection electrode RE11 in the contact hole CH10, and similarly, the size of the contact hole CH11 can be defined as the area of the common electrode CE in the contact hole CH11.

One dummy semiconductor layer DSC overlaps the wire electrode EL11.

In the example shown in FIG. 6, the pixel electrode PE11 corresponds to the first pixel electrode, the contact hole CH10 corresponds to the first contact hole, and the contact hole CH11 corresponds to the second contact hole.

Figure 7:
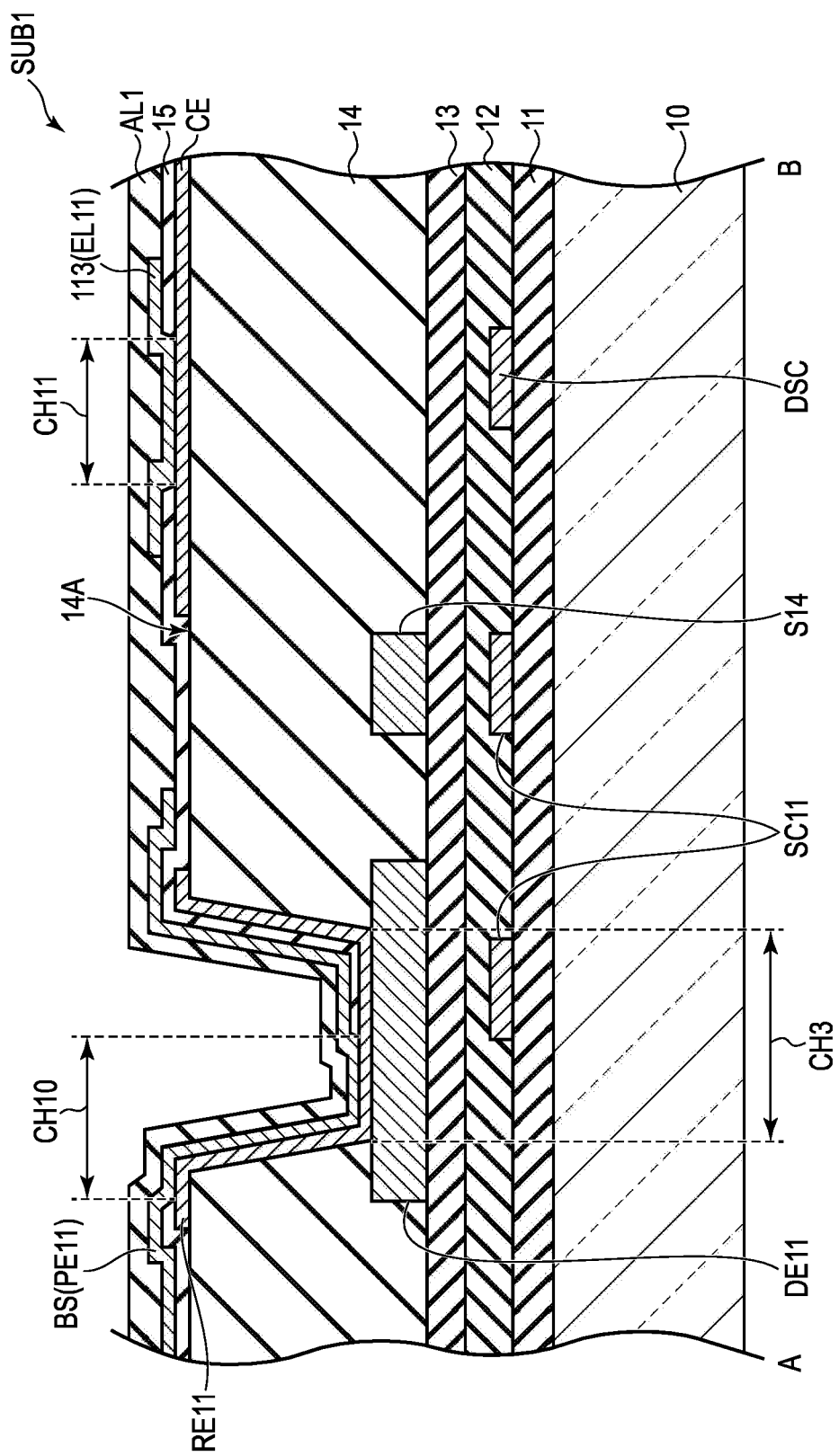
FIG. 7 is a cross-sectional view of a first substrate SUB1 taken along line A-B shown in FIG. 6.

FIG. 7 is a cross-sectional view of the first substrate SUB1 taken along line A-B shown in FIG. 6. The illustrated example corresponds to a case where a fringe field switching (FFS) mode which is a display mode using a lateral electric field is applied.

The first substrate SUB1 includes an insulating substrate 10, insulating films 11 to 15, the semiconductor layer SC11, the dummy semiconductor layer DSC, the drain electrode DE11, the signal line S14, the connection electrode RE11, the common electrode CE, the pixel electrode PE11, the wire electrode EL11, an alignment film AL1 and the like.

The insulating substrate 10 is a substrate having optical transparency such as a glass substrate or a flexible resin substrate. The insulating film 11 is located on the insulating substrate 10. The semiconductor layer SC11 is located on the insulating film 11 and is covered with the insulating film 12. The drain electrode DE11 and the signal line S14 are located on the insulating film 13 and are covered with the insulating film 14. The connection electrode RE11 and the common electrode CE are located on the insulating film 14 and are covered with the insulating film 15. The connection electrode RE11 is in contact with the drain electrode DE11 in the contact hole CH3 penetrating the insulating film 14. The illustrated common electrode CE is located on a flat upper surface 14A of the insulating film 14 and does not overlap any of the contact holes in the insulating films 11 to 14. The pixel electrode PE11 and the wire electrode EL11 are located on the insulating film 15 and are covered with the alignment film AL1. The base portion BS of the pixel electrode PE11 is in contact with the connection electrode RE11 in the contact hole CH10 penetrating the insulating film 15. The base portion 113 of the wire electrode EL11 is in contact with the common electrode CE in the contact hole CH11 penetrating the insulating film 15. The alignment film AL1 is not in contact with the common electrode CE but is directly stacked on the wire electrode EL11 in the contact hole CH11. Directly below the contact hole CH11, the insulating film 14 is directly stacked on the insulating film 13, and no conductive layer is disposed in the same layer as the signal line S14. That is, between the dummy semiconductor layer DSC and the common electrode CE, the insulating film 13 is directly stacked on the insulating film 12, the insulating film 14 is directly stacked on the insulating film 13, and the common electrode CE is not in contact with the dummy semiconductor layer DSC. Directly above the signal line S14, the insulating film 15 is directly stacked on the insulating film 14.

Each of the signal line S14 and the drain electrode DE11 is formed of a metal material such as aluminum (Al), titanium (Ti), silver (Ag), molybdenum (Mo), tungsten (W), copper (Cu) or chromium (Cr), an alloy obtained by combining these metal materials or the like, and may have a single-layer structure or a multilayer structure. Each of the connection electrode RE11, the common electrode CE, the pixel electrode PE11 and the wire electrode EL11 is a transparent electrode formed of a transparent conductive material such as indium tin oxide (ITO) or indium zinc oxide (IZO).

Each of the insulating films 11 to 13 and the insulating film 15 is an inorganic insulating film formed of an inorganic insulating material such as silicon oxide, silicon nitride or silicon oxynitride, and may have a single-layer structure or a multilayer structure. The insulating film 14 is, for example, an organic insulating film formed of an organic insulating material such as acrylic resin.

As described above, the contact hole CH11 is larger than the contact hole CH10. This is caused by a difference in underlying structure between the contact holes CH10 and CH11. That is, since the contact hole CH10 partly overlaps the contact hole CH3, the contact hole CH10 is influenced by a difference in level of the insulating film 14. On the other hand, the contact hole CH11 overlaps the flat upper surface 14A. Therefore, at the time of etching the insulating film 14, a difference in etching conditions between the areas corresponding to the contact holes CH10 and CH11 causes a difference in size between the contact holes CH10 and CH11.

In the present embodiment, even if the contact hole CH11 is expanded, the common electrode CE exposed from the contact hole CH11 is still entirely covered with the wire electrode EL11. Therefore, moisture intrusion from the contact hole CH11 can be suppressed.

Moisture intrusion from the contact hole CH11 may cause, for example, the common electrode CE and the insulating film 15 to peel away from each other. In the pixel PX of the display portion DA, if the common electrode CE and the insulating film 15 are peeled away from each other, a voltage applied to liquid crystal cannot be held between the pixel electrode PE and the common electrode CE, and display failure occurs (black display irregularities appear).

The inventors prepared the first sample in which the entire contact hole CH11 is covered with the wire electrode and the second sample in which a part of the contact hole CH11 is covered with the wire electrode, and conducted an experiment by exposing them to environment of high temperature and high humidity. As the experiment conditions, the temperature was 85° C., the humidity was 85%, and the amount of time for exposure was 240 hours. As a result of the experiment, black display irregularities appeared in the second sample but black display irregularities did not appear in the first sample. The experiment confirmed that covering of the entire contact hole CH11 with the wire electrode is effective in suppressing black display irregularities caused by moisture intrusion.

Therefore, according to the present embodiment, degradation in display quality can be suppressed.

Figure 8A:
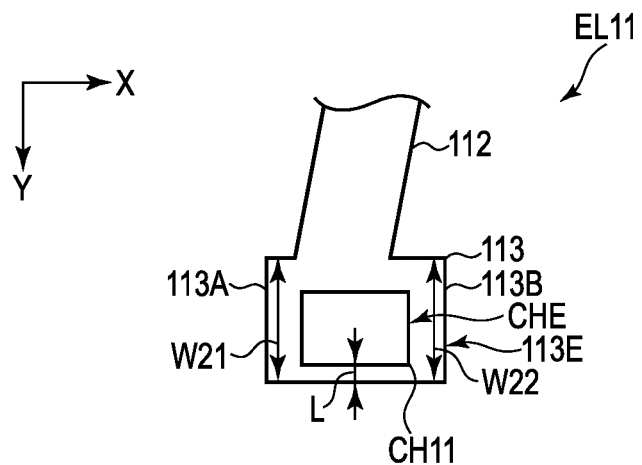
FIG. 8A is a plan view showing a state where the wire electrode EL11 and a contact hole CH11 overlap.
Figure 8B:
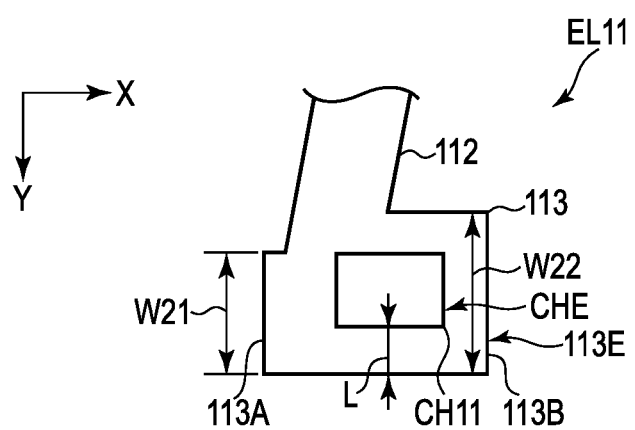
FIG. 8B is another plan view showing a state where the wire electrode EL11 and the contact hole CH11 overlap.

FIGS. 8A and 8B are plan views showing a state where the wire electrode EL11 overlaps the entire contact hole CH11. In each of the illustrated configuration examples, both an edge 113E of the base portion 113 and an edge CHE of the contact hole CH11 are formed in a rectangular shape, but are not limited to this shape, and may be formed in another shape such as a circular shape or an elliptical shape.

In the configuration example shown in FIG. 8A, one end portion 113A of the base portion 113 has a width W21, and the other end portion 113B of the base portion 113 has a width W22. The widths W21 and W22 are lengths along the second direction Y. The width W21 is equal to the width W22. The contact hole CH11 is located between one end portion 113A and the other end portion 113B. The entire edge CHE overlaps the base portion 113. That is, in planar view, the edge 113E does not cross the edge CHE, and the entire edge 113E is located more outward than the edge CHE. A shortest distance L between the edge 113E and the edge CHE is greater than or equal to 1 µm, preferably, greater than or equal to 2 µm, more preferably, greater than or equal to 2.25 µm.

The configuration example shown in FIG. 8B is different from the configuration example shown in FIG. 8A in that the base portion 113 is expanded. More specifically, the other end portion 113B is expanded along the second direction Y more than one end portion 113A. The width W22 is greater than the width W21. Therefore, as compared with the configuration example shown in FIG. 8A, the entire edge 113E is located even more outward than the edge CHE, and the shortest distance L between the edge 113E and the edge CHE are expanded. According to such a configuration example, even if the wire electrode EL11 and the contact hole CH11 are relatively displaced from each other, the entire contact hole CH11 is still covered with the wire electrode EL11, and moisture intrusion can still be suppressed.

FIG. 9 is a cross-sectional view of the display panel PNL taken along line C-D shown in FIG. 5B. The configuration of the first substrate SUB1 has been explained with reference to FIG. 7. Note that, although illustrations and explanations are omitted in FIG. 7, for example, the insulating film 14 may be formed of a double-layer structure of an insulating film 141 and an insulating film 142, and metal lines ML13 and ML14 may be disposed between the insulating film 141 and the insulating film 142. The metal line ML13 is located directly above the signal line S13 and extends parallel to the signal line S13. The metal line ML14 is located directly above the signal line S14 and extends parallel to the signal line S14. These metal lines ML13 and ML14 can form the sensor lines L (L1, L2, L3, etc.) of the touch sensor TS or the dummy lines D explained with reference to FIG. 2. In this case, the common electrode CE formed in the display portion DA is formed on the insulating film 142 and is electrically connected to the sensor line L via a contact hole formed in the insulating film 142. The insulating film 141 is located between the insulating film 13 and the insulating film 142, covers the switching element, and forms a flat upper surface (a surface which is in contact with the insulating film 142 or a surface which is in contact with the sensor line L). The insulating film 141 is formed of an organic material, and the insulating film 142 may be formed of the same organic material as the insulating film 141 or be formed of an inorganic material. Furthermore, a connection electrode formed of the same material and formed in the same process as the sensor line L may be formed between the connection electrode RE11 and the drain electrode DE.

The second substrate SUB2 includes an insulating substrate 20, a light-shielding layer BM, a color filter CF, an overcoat layer OC, an alignment film AL2 and the like. Similarly to the insulating substrate 10, the insulating substrate 20 is a substrate having optical transparency such as a glass substrate or a flexible resin substrate. The light-shielding layer BM and the color filter CF are located on a side opposed to the first substrate SUB1 of the insulating substrate 20. The color filter CF is opposed to the pixel electrode PE11 in the third direction Z. The overcoat layer OC covers the color filter CF. The overcoat layer OC is formed of transparent resin. As the color filter CF, a red color filter, a green color filter, a blue color filter and the like are included. The alignment film AL2 covers the overcoat layer OC. The alignment films AL1 and AL2 are formed of, for example, a material exhibiting horizontal alignment properties.

The first substrate SUB1 and the second substrate SUB2 described above are disposed such that the alignment films AL1 and AL2 are opposed to each other. The cell gap between the first substrate SUB1 and the second substrate SUB2 is, for example, 2 to 5 μm.

The liquid crystal layer LC is located between the first substrate SUB1 and the second substrate SUB2 and is held between the alignment film AL1 and the alignment film AL2. The liquid crystal layer LC contains liquid crystal molecules LM. The liquid crystal layer LC is composed of a positive liquid crystal material (having positive dielectric anisotropy) or a negative liquid crystal material (having negative dielectric anisotropy).

An optical element OD1 including a polarizer PL1 is bonded to the insulating substrate 10. An optical element OD2 including a polarizer PL2 is bonded to the insulating substrate 20. Note that each of the optical elements OD1 and OD2 may include a retardation plate, a scattering layer, an antireflective layer or the like as needed. An illumination device IL illuminates the first substrate SUB1 of the display panel PNL with white illumination light.

In this display panel PNL, in an off state where an electric field is not formed between the pixel electrode PE11 and the common electrode CE, the liquid crystal molecules LM are initially aligned in a predetermined direction between the alignment films AL1 and AL2. In the off state, the illumination light emitted from the illumination device IL toward the display panel PNL is absorbed in the optical elements OD1 and OD2, and this results in dark display. On the other hand, in an on state where an electric field is formed between the pixel electrode PE11 and the common electrode CE, the liquid crystal molecules LM are aligned in a direction different from the initial alignment direction by the electric field, and the alignment direction is controlled by the electric field. In the on state, a part of the illumination light from the illumination device IL is transmitted through the optical elements OD1 and OD2, and this results in light display.

Figure 10:
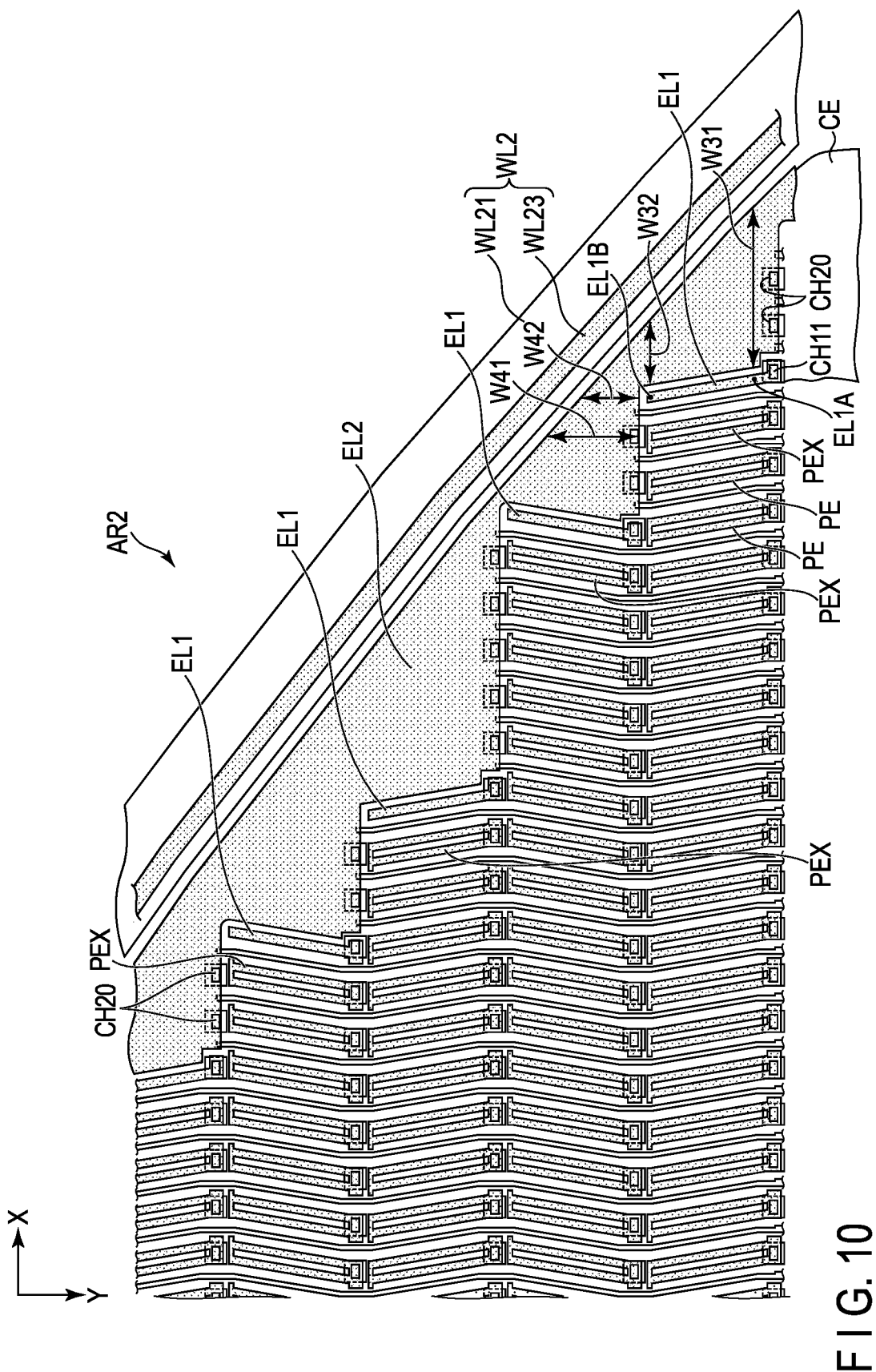
FIG. 10 is a plan view showing a configuration example of an area AR2 close to a round portion R12 shown in FIG. 1.

FIG. 10 is a plan view showing a configuration example of an area AR2 close to the round portion R12 shown in FIG. 1.

As shown in the drawing, in the area AR2, the number of pixel electrodes PE arranged in the first direction X varies according to row. A row is composed of pixels arranged in the first direction X. In each row, the pixel electrode PEX in the outermost pixel and the wire electrode EL1 are arranged in the first direction X. In the illustrated example, one wire electrode EL1 is disposed in each row, and one wire electrode EL1 and one pixel electrode PEX are arranged in the first direction X.

Between the wire electrode EL1 and the wiring line WL2, an electrode EL2 located in the same layer as the pixel electrode PEX and the wire electrode EL1 is disposed. The electrode EL2 is electrically connected to the common electrode CE in a plurality of contact holes CH20. That is, both the wire electrode EL1 and the electrode EL2 are electrically connected to the common electrode CE and have the same potential. The electrode EL2 is apart from not only the pixel electrode PEX but also the other pixel electrode PE, and is also apart from the wiring line WL2. The electrode EL2 spreads over a space between each of the pixel electrode PE and the wire electrode EL1 and the wiring line WL2.

For example, the electrode EL2 has a width W31 between a first portion EL1A of the wire electrode EL1 and the wiring line WL2, and has a width W32 between a second portion EL1B of the wire electrode EL1 and the wiring line WL2. The first portion EL1A is closer to the contact hole CH11 than the second portion EL1B. The width W31 is greater than the width W32. These widths W31 and W32 are lengths along the first direction X.

In addition, the electrode EL2 has a width W41 between the pixel electrode PEX and the wiring line WL2, and has a width W42 between the wire electrode EL1 and the wiring line WL2. The width W41 is greater than the width W42. These widths W41 and W42 are lengths along the second direction Y.

The pixel electrode PE, the wire electrode EL1 and the electrode EL2 are formed by patterning the same transparent conductive film. According to the present configuration example, at the time of patterning, it is possible to suppress narrowing of the pixel electrode PEX of the outermost pixel relative to the pixel electrode PE close to the center of the display portion DA. Therefore, uniform dimensional accuracy can be achieved in the pixel electrodes PE.

Figure 11:
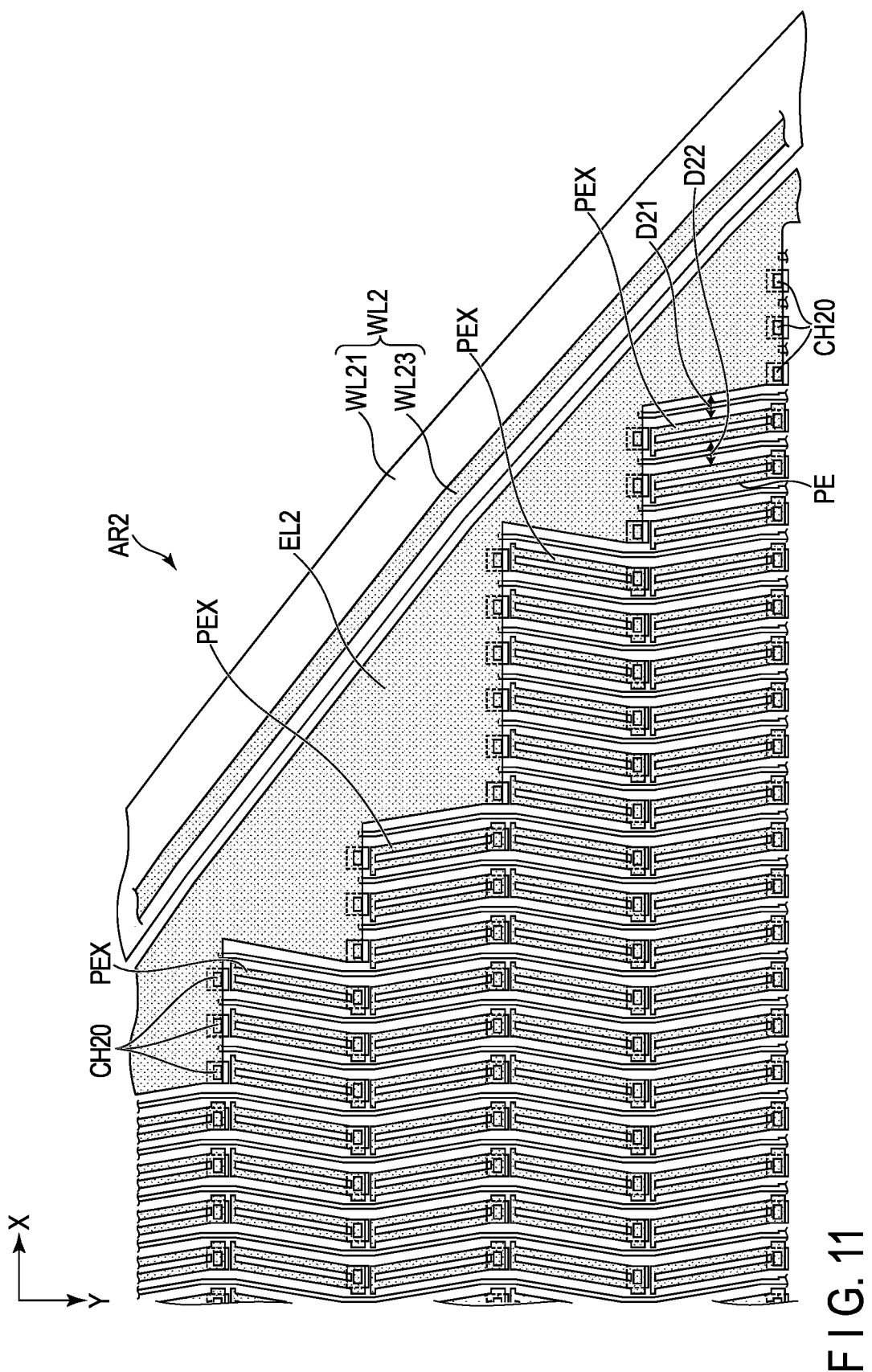
FIG. 11 is a plan view showing another configuration example of the area AR2 close to the round portion R12 shown in FIG. 1.

FIG. 11 is a plan view showing another configuration example of the area AR2 close to the round portion R12 shown in FIG. 1.

The configuration example shown in FIG. 11 is different from the configuration example shown in FIG. 10 in that the wire electrode EL1 is omitted and the pixel electrode PEX and the electrode EL2 are arranged in the first direction X. As described above, since the wire electrode EL1 has the same potential as the electrode EL2, the wire electrode can be omitted. Note that a distance D21 between the pixel electrode PEX and the electrode EL2 is equal to a distance D22 between the pixel electrode PE and the pixel electrode PEX. These distances D21 and D22 are lengths along the first direction X.

In this configuration example also, substantially the same effects as those of the configuration example shown in FIG. 10 can be obtained.

FIG. 12 is a plan view showing another configuration example of the area AR2 close to the round portion R12 shown in FIG. 1.

The illustrated configuration example is different from the configuration example shown in FIG. 10 in that the electrode EL2 is omitted and the wire electrode EL1 is bent into a substantially L shape. That is, the wire electrode EL1 includes a first electrode portion 101 and a second electrode portion 102 extending in a direction different from the first electrode portion 101. The first electrode portion 101 is closer to the contact hole CH11 than the second electrode portion 102. The first electrode portion 101 extends parallel to the pixel electrode PEX. The pixel electrode PEX and the first electrode portion 101 are arranged in the first direction X. The second electrode portion 102 is continuous with the first electrode portion 101. The second electrode portion 102 extends along the first direction X. The second electrode portion 102 and the pixel electrode PEX are arranged in the second direction Y. In addition, the second electrode portion 102 and the other pixel electrode PE are arranged in the second direction Y.

In this configuration example also, substantially the same effects as those of the configuration example shown in FIG. 10 can be obtained.

As explained above, according to the present embodiment, a display device which can suppress degradation in display quality can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the red pixel, the green pixel and the white pixel have the same pixel width in the present embodiment but may have different pixel widths from one another. In addition, the pixel electrodes of the red pixel, the green pixel and the white pixel have the same shape in the present embodiment but may have different shapes from one another.

What is claimed is:

1. A display device comprising:
   a signal line;
   a switching element;
   a common electrode;
   an insulating film covering the common electrode;
   a first pixel electrode electrically connected to the switching element in a first contact hole penetrating the insulating film; and
   a transparent conductive film electrically connected to the common electrode in a second contact hole penetrating the insulating film, wherein
   the first pixel electrode and the transparent conductive film are arranged in a first direction in a same layer,
   the first pixel electrode is opposed to the common electrode in a display portion displaying an image,
   the transparent conductive film is opposed to the common electrode in a non-display portion surrounding the display portion,
   the common electrode is disposed over the display portion and the non-display portion,
   a size of the first contact hole and a size of the second contact hole are different from each other in planar view,
   the first pixel electrode comprises a plurality of strip electrodes,
   the transparent conductive film is a wire electrode,
   a width of the wire electrode is greater than a width of the strip electrode,
   the signal line is located between the first pixel electrode and the wire electrode, and
   a distance between the strip electrode and the signal line is equal to a distance between the wire electrode and the signal line.

2. The display device of claim 1, wherein the wire electrode extends in a direction parallel to the strip electrode.

3. The display device of claim 1, further comprising:
   a scanning line crossing the signal line;
   a semiconductor layer of the switching element, the semiconductor layer crossing the scanning line and electrically connected to the signal line and the first pixel electrode; and
   a dummy semiconductor layer crossing the scanning line, overlapping the wire electrode, and being electrically floating.

4. The display device of claim 1, wherein a distance between an edge of the second contact hole and an edge of the transparent conductive film is greater than or equal to 1 µm in planar view.

5. A display device comprising:
   a switching element;
   a common electrode;
   an insulating film covering the common electrode;
   a first pixel electrode electrically connected to the switching element in a first contact hole penetrating the insulating film;
   a transparent conductive film electrically connected to the common electrode in a second contact hole penetrating the insulating film;
   an inorganic insulating film;
   a signal line and a drain electrode of the switching element located on the inorganic insulating film; and
   an organic insulating film covering the signal line and the drain electrode and stacked on the inorganic insulating film, wherein
   the first pixel electrode and the transparent conductive film are arranged in a first direction in a same layer,
   the first pixel electrode is opposed to the common electrode in a display portion displaying an image, the transparent conductive film is opposed to the common electrode in a non-display portion surrounding the display portion, the common electrode is disposed over the display portion and the non-display portion, a size of the first contact hole and a size of the second contact hole are different from each other in planar view, the common electrode is located on the organic insulating film, the first pixel electrode is electrically connected to the drain electrode in a third contact hole penetrating the organic insulating film, the drain electrode and the first pixel electrode are connected to each other by a connection electrode in the third contact hole and the first contact hole, and directly below the second contact hole, the organic insulating film is stacked on the inorganic insulating film and no conductive layer is disposed in the same layer as the signal line.

6. The display device of claim 5, further comprising a second pixel electrode, wherein the first pixel electrode and the second pixel electrode are arranged in a second direction, and the second pixel electrode and the transparent conductive film are arranged in the first direction.

7. The display device of claim 5, further comprising:

a wiring line having a fixed potential and located in the non-display portion; and an electrode located in a same layer as the first pixel electrode and the transparent conductive film and electrically connected to the common electrode, wherein the electrode is apart from the first pixel electrode and the wiring line and spreads between the first pixel electrode and the wiring line.

8. The display device of claim 5, wherein the transparent conductive film has a first electrode portion, and a second electrode portion extending in a direction different from the first electrode portion, the first pixel electrode and the first electrode portion are arranged in a first direction, and the first pixel electrode and the second electrode portion are arranged in a second direction.

* * * * *